Sept. 22, 1959  G. E. KING ET AL  2,905,838
PUNCH PRESS CONTROL
Filed May 29, 1956
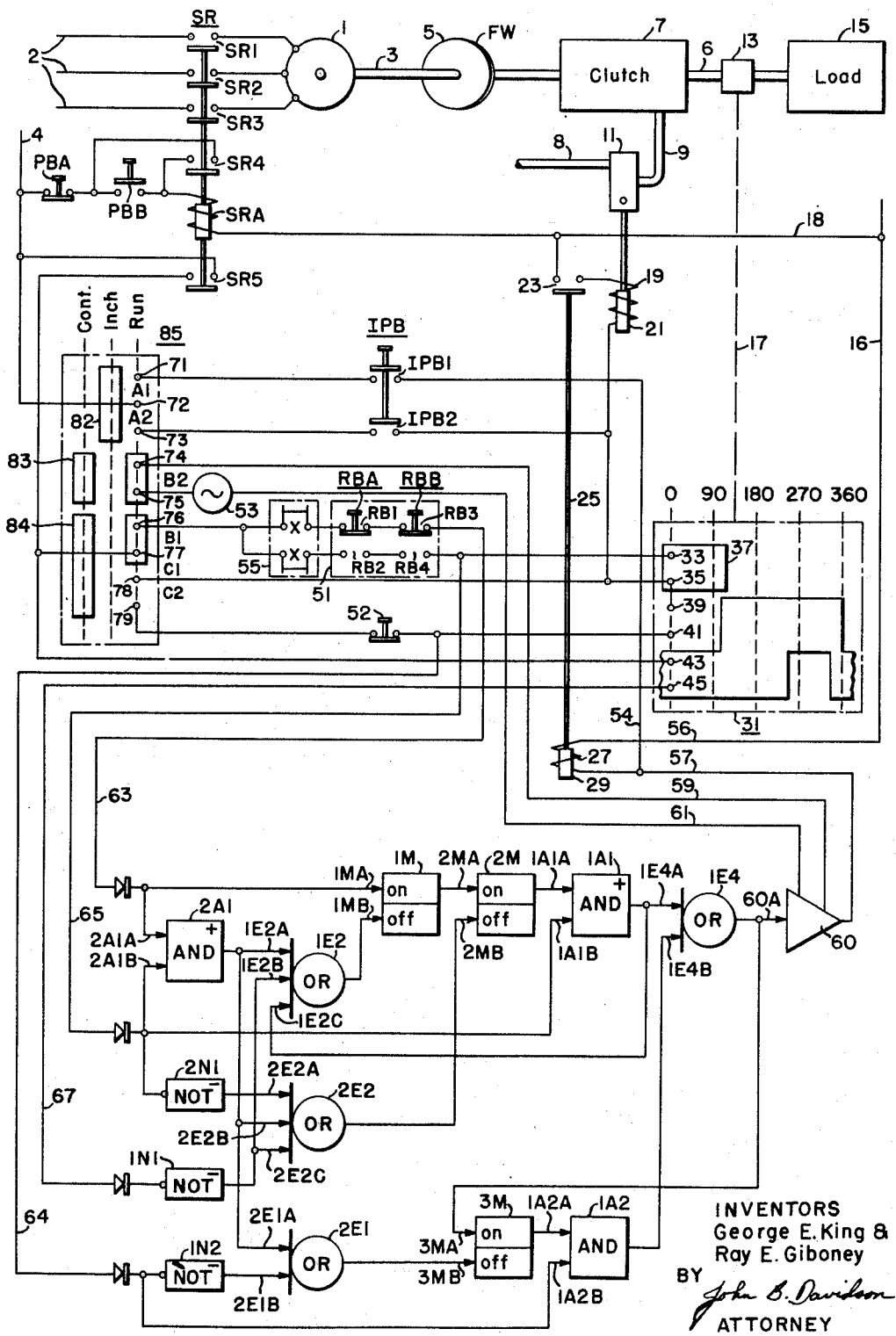
INVENTORS
George E. King &
Ray E. Giboney
BY
John B. Davidson
ATTORNEY

United States Patent Office 2,905,838
Patented Sept. 22, 1959

2,905,838
PUNCH PRESS CONTROL

George E. King, Eggertsville, and Ray E. Giboney, Williamsville, N.Y., assignors to Westinghouse Electric Corporation, East Pittsburgh, Pa., a corporation of Pennsylvania Application May 29, 1956, Serial No. 588,080

9 Claims. (Cl. 307—112)

This invention relates to machine tool control circuits and more particularly to circuits for controlling the operation of a cyclically operating machine responsive to the energization and deenergization of electromagnetic means.

Machine tools of the nature of the punch press have been controlled for some years by a compressed air actuated clutch, coupling the press to a relatively constant speed prime mover such as an induction motor. The compressed air that actuates the clutch is controlled by an electromagnetically actuated valve so that the control equipment energizing the electromagnet need have only a relatively low power output. Systems of this general nature are described in United States Patent No. 2,802,154 of R. P. Bonn for "Punch Press Control." Requirements of the control system for the electromagnet are that the electromagnet should not be energized unless all of a predetermined number of control buttons are depressed by the human operator or operators, that the press should complete its cycle after the actual punching has been completed, that one and only one cycle of operation be completed while the control buttons are continuously depressed, and that "on the hop" operation be provided to furnish the operator with means for safely increasing the productive capacity of the machine. It is further desirable that the components utilized in the control circuitry be of a nature that will require a minimum amount of repair or preventive maintenance so as to minimize the down time and subsequent loss of productive capacity of the machine. This requirement has become increasingly important in recent years in view of assembly line techniques whereby a number of machines will be shut down when the assembly line is deprived of the productive capacity of any one of the machines. Prior art control systems have required a multiplicity of relays and other devices having moving parts and arcing contacts that have proven to be sources of considerable maintenance problems.

Additionally, in those installations where there are a plurality of operators all of whom have to actuate push buttons for the purpose of actuating the clutch, it is desirable that all of the operators must return their push buttons to the non-actuated position after one operator has released his push button, before the press can be started after having once been stopped during a particular cycle of operation. In such installations it is often desirable to dummy-plug one or more of the push buttons of the operators. It is mandatory in such instance that provision be made for preventing actuation of the clutch when all of the operating push buttons are dummy-plugged.

Accordingly, it is one object of this invention to provide an improved control system for a cyclically operating machine tool.

Another object is to provide a machine tool making use of static control elements wherever possible.

Still another object is to provide a machine tool control system having a minimum number of mechanical components with moving parts or make-and-break contact members.

A further object is to provide a machine tool control system having static decision elements wherein a plurality of operating positions are provided, all of the manually operable control elements of which must be returned to the non-actuated position before the machine can go through another operating cycle.

Yet another object is to provide a simple reliable control system for a punch press controlled by an electromagnetically actuated air clutch wherein the machine can go through one and only one operating cycle without releasing manually actuable control elements thereof.

Other objects and features of this invention will become apparent upon consideration of the following description thereof when taken in connection with the accompanying drawing, wherein the single figure is a schematic diagram of a machine tool control system in accordance with the teachings of this invention.

Before proceeding with the detailed description of the invention, it is well to define certain of the components that are utilized therein and to briefly describe their operation. The components to which reference is made are static devices that are referred to in the art as And, Or, Not, and Memory or Flip-Flop circuits. An And circuit may be defined as a circuit that responds to a plurality of conditions and has an output dependent on such conditions. The relationship is such that the And element transfers from a first to a second output condition or state only if all of the conditions are present.

An Or circuit is a circuit that has an output dependent on a plurality of conditions. The relationship is such that the Or element has an output signal if any of the conditions are present. An Or circuit having plural inputs may be designed to supply an output only if energy is supplied to any of its input circuits.

A Not circuit is a circuit which has substantially zero output voltage or current when an input control signal is applied thereto and an output voltage or current when no input signal is applied thereto.

A Memory or Flip-Flop circuit is a bistable circuit that, in response to a first condition, produces an output that is maintained even though the first condition thereafter is discontinued. The Memory element is reset and the output terminated in response to a second condition. Thus, the Memory circuit may produce an output voltage or current in response to a signal applied to a first control circuit thereof even though the signal is discontinued, and will discontinue the output signal only in response to a second signal applied to a second control circuit thereof.

Suitable And, Or, Not and Memory circuits for practicing this invention may be found in the A.I.E.E. Conference Paper No. CP56-91 by W. G. Evans, W. G. Hall, and R. I. Van Nice entitled "Magnetic Logic Circuits for Industrial Control Systems." The logic circuits described therein make use of the so-called "Ramey Magnetic Amplifier," and have been found to be entirely satisfactory for the purposes of this invention. One characteristic of the Memory circuitry described therein is that an output signal of one phase will be produced in response to an "on-signal," and in response to an "off-signal" an output signal will be produced that is 180° out of time phase relationship with the signal produced in response to the on-signal. Since the other circuitry described can be designed to be responsive only to the output signal produced in response to the on-signal and not to signals 180° out of time phase therewith, no particular problem has been encountered as a result of this characteristic.

With reference now to the control circuitry of the figure, there is shown in block schematic form a punch press 15 which is coupled to a prime mover such as synchronous motor 1 by means of shafts 3 and 6, which shafts are selectively coupled together by means of compressed air actuated clutch 7. A flywheel 5 is affixed to shaft 3 to smooth out possible variations in the rotational speed of the shaft due to the sudden load variations on the motor when the clutch is actuated and deactuated. A gearing member 13 is affixed to shaft 8 for the purpose of driving limit switch 31 which may be of the rotating drum type. For purposes of illustration, limit switch 31 is shown in planar form. Induction motor 1 is energized from three-phase buses 2 and is coupled to the buses by means of the contacts SR1, SR2, and SR3 of relay SR. The actuating winding SRA of relay SR is energized by depressing push button PBB and is deenergized by depressing push button PBA. SR4 seals in the relay when push button PBB is depressed. Energizing current for relay winding SRA is derived from power buses 4 and 16.

Clutch 7 is actuated by means of compressed air from a source that is not shown through compressed air lines 8 and 9, which compressed air lines are selectively coupled together by means of valve 11. Valve 11 is an electromagnetically energized valve of conventional design that is actuated by current passing through winding 19 upon closure of contacts 23 of relay 25. The relay 25 is in turn energized by current passing through winding 27 which is energized by the output current of magnetic amplifier 60. If the magnetic amplifier has sufficient power output, relay 25 may be eliminated and magnetic amplifier 60 utilized to directly energize winding 19.

Normally open contact SR5 of relay SR connects bus 4 to contact 77 of selector switch 85. The function of selector switch 85 is to choose the mode of operation for the press, either "run," "inch" or "continuous." Shorting bar 82 connects together contacts 71, 72 and 73 of the selector switch when it is desired to operate the press in the inch mode. For operation in the run mode shorting bar 81 connects together contacts 74 and 75 and shorting bar 80 connects together contacts 76 and 77. For operation in the continuous mode shorting bar 83 connects together contacts 74 and 75 and shorting bar 84 connects together contacts 76, 77, 78 and 79.

For the purpose of controlling the circuitry in conjunction with the various push buttons described below, limit switch 31 is provided to determine the effectiveness of the push buttons during the cycle of operation of the press. The limit switch, as shown, has contact terminals 33, 35, 39, 41, 43 and 45 that are bridged in various combinations at various times in the cycle of the limit switch as indicated in the diagrammatic representation of the limit switch. The punching operation is effected at about the 160° position of the press.

In order to facilitate the explanation of the machine and its operation, the operating cycle of the apparatus will be described, assuming first that the selector switch 85 has been set in the "run" position. When shorting bar 81 connects together contacts 74 and 75, A.C. source 53 will be connected to energize magnetic amplifier 60 through lines 59 and 61. Connection together of contacts 76 and 77 by shorting bar 80 will energize the input circuit 1MA of Memory circuit 1M through the normally closed contacts RB1 and RB3 of push buttons RBA and RBB. The reference numeral 55 designates any number of other operating positions similar to the operating position designated by reference numeral 51, which latter operating position includes the aforementioned push buttons RBA and RBB. The push buttons included within the other operating stations 55 are here assumed to have been dummy-plugged, as is indicated by the reference characters X—X. The normally closed contacts RB1 and RB3 also energize an input circuit 2A1A of And circuit 2A1, but no output will appear therefrom until the other input circuit 2A1B is energized. The function of And circuit 2A1 will be set forth below.

It is to be noted that the input control circuits of the various logic circuits herein set forth are represented only by arrows. Reference is made to the aforementioned A.I.E.E. Conference paper for a description of the control circuits. As has been mentioned, setting the selector switch 85 in the run position will produce an output signal from Memory circuit 1M. This, in turn, will energize input circuit 2MA of Memory 2M to further energize input circuit 1A1A of And circuit 1A1. No output signal will appear from And circuit 1A1 until the other input circuit, or control circuit, 1A1B is energized.

When the run push buttons RBA and RBB are depressed, input circuit 1A1B of And circuit 1A1, input circuit 2A1B of And circuit 2A1 and the input circuit of Not circuit 2N1 will be energized. Simultaneously therewith, input circuit 2A1A will be deenergized so that there will be no output signal appearing from And circuit 2A1. It will be evident that an output signal will be produced by And circuit 2A1 only when all of the push button stations 51 and 55 are dummy-plugged. In this event, the off-signal control circuits 1MB of Memory 1M, 1A1B of And circuit 1A1 and off-signal control circuit 3MB of Memory 3M will be energized through Or circuits 1E2, 2E2 and 2E1, respectively, so that no operating output signals will appear from the Memory circuits. This will prevent operation of the press as will become evident below.

Energization of control circuit 1A1B and And circuit 1A1 will be effective to couple the output signal from Memory circuit 2M to input circuit 1E4A of Or circuit 1E4 and thus energize the input circuit 60A of magnetic amplifier 60. An output current will thus be produced from the magnetic amplifier which will energize winding 29 to close contact 23, energize winding 19 to actuate the valve 21 and thus actuate clutch 7. Motor 1 will begin driving the press 15 and the limit switch 31. Energization of Not circuit 2N1 upon closing of contacts RB2 and RB4 will not energize input circuit 2E2C of Or circuit 2E2 and thus there will be no off signal applied of off signal input circuit 2MB of Memory 2M. Further, limit switch contacts 43 and 45 will be connected together to energize the input circuit of Not circuit 1N1 to not energize both input circuits 1E2B and 2E2C of Or circuits 1E2 and 2E2 respectively so that neither of the off-signal control circuits of 1M and 2M will be energized. Since the input circuit of Not circuit 1N2 is not energized, an output signal will appear from Not circuit 1N2 which will be coupled to the off-signal control circuit 3MB of Memory 3M through Or circuit 2E1, so that no output signal will appear from Memory circuit 3M.

After the limit switch has rotated about 100°, shortly before the punching operation has been completed, contact 39 is connected to contact 41 and contact 41 connected to contact 43. Since contacts 35 and 39 are permanently connected together, the input circuit of Not circuit 1N2 will be energized and the input control circuit 1A2B of And circuit 1A2 will also be energized. Since there is no output signal from Not circuit 1N2, the off-signal input circuit 3MB of Memory 3M will not be energized. Additionally, the continuing output from And circuit 1A1 will be coupled to the on-signal input circuit 3MA of Memory 3M through Or circuit 1E4 so that there will be a continuing output fed to input circuit 1E4B of Or circuit 1E4 through And circuit 1A2. This means that if the run push buttons RBA and RBB should be released so as to deenergize the input control circuit 1A1B of And circuit 1A1, the continuing output from Memory 3M will energize input circuit 60A of amplifier 60 to maintain clutch 7 in its actuated position. In effect, this means that control has been removed from the run push buttons so that the press will complete its cycle of operation even through the run push buttons should be released.

Shortly after the punching operation has been completed so that the press is on its up-stroke, the limit switch will disconnect contact 43 from contact 45 so that Not circuit 1N1 will be effective to energize off-signal control circuits 1MB and 2MB of Memory circuits 1M and 2M, respectively. The output signal from the signals generated by the two Memory circuits 1M and 2M will disappear, but the press will continue through the cycle by virtue of the continuing output signal from Memory circuit 3M. Shortly before the end of the cycle of operation, terminal 43 is again connected to terminal 45 but the on-signal input circuits 1MA and 2MA of Memories 1M and 2M will not be energized unless the run push buttons RBA and RBB are released so as to complete a circuit to the Memory circuit on-signal control 1MA through the push button contacts RB1 and RB3. This insures that only one cycle of operation will be completed while the push buttons are in their depressed position, the so-called "anti-repeat" feature of the control circuit. A short interval of time is left between the instant at which terminals 43 and 45 are again connected together and the instant at which terminals 39, 41 and 43 are disconnected so that the operator, if he so desires, can release the push buttons RBA and RBB, remove the work material then in the press and insert new material to be stamped during the next cycle of operation of the machine without bringing the machine to a complete stop. At about the instant at which the limit switch rotates through about 360°, contacts 39, 41 and 43 are disconnected from each other as has been indicated.

For operation in the inch mode, contacts 71, 72 and 73 are connected together as has been indicated. Depressing the inch push button IPB closes contact IPB1 to energize coil 27 of relay 25 by completing a circuit from bus 4 through contacts 72 and 71, inch push-button contact IPB1, lead 54, coil 27 and lead 56. Inch push button contact IPB2 is also closed, which will now complete a circuit from bus 4 through contacts 72 and 73, contact IPB2, coil 19, contact 23, and lead 18 to bus 16. This will actuate air valve 11 and actuate the clutch. The logic circuitry aforedescribed is not affected by the actuation of inch push button IPB.

For operation in the continuous mode the run push buttons RBA and RBB are effectively short circuited by shorting bar 84 and contact members 33 and 35. The input circuit of Not circuit 1N2 is energized at all times by short-circuiting contacts 77, 78 and 79 so that Memory circuit 3M, once input circuit 3MA thereof has been energized, will supply a continuous output signal to amplifier 60. In effect, this removes the Memory circuits 1M and 2M, insofar as their effect on the amplifier 60 is concerned, except during the beginning of the operation until input circuit 3MA has been initially energized. To stop the operation while operating in the continuous mode, push button 52 is depressed. If continuous operation is not desired, shorting bars 83 and 84 may be removed from the selector switch 85.

It has been found that the circuitry above described is extremely reliable in operation, since practically all of the circuits that operate cyclically do not include relays or other mechanical devices which are about to cause maintenance and repair problems. The possibility that the work material may be damaged by shorting all of the run push buttons is entirely eliminated, the apparatus having been faultless in operation to the present time.

Since numerous changes may be made in the above-described construction and different embodiments of the invention may be made without departing from the spirit and scope thereof, it is intended that all the matter contained in the foregoing description or shown in the accompanying drawings shall be interpreted as illustrative and not in a limiting sense.

We claim as our invention:

1. In a control system for controlling the operating cycle of a machine tool in response to the energization of a machine tool control device operatively connected to said machine tool, the combination of first and second Memory devices each having an output circuit, and a first input circuit for producing an output control signal in said output circuit, and a second input circuit for cutting off said output control signal in said output circuit; a first And device coupled between the output circuit of said first Memory device and said machine tool control device for energization of said control device responsive to said output control signal of the first Memory device; said first And device being further coupled to said first input circuit of said second Memory device for energization of the latter first input circuit in accordance with said output control signal from said first Memory device; a second And device connected for energizing the second input circuit of said first Memory device; first switch control means adapted to be connected to be driven by said machine tool and including a first pair of contacts that are closed over a first portion of the operating cycle of said tool, and a second pair of contacts that are closed over a second portion of said cycle; second switch control means having an actuated position and a non-actuated position and operative for energizing said first And device in the non-actuated position of said second switch means; a Not device connected between said first pair of contacts of the first switch control means and said second input circuits of said first and second Memory devices for cutting off the respective output control signals from said first and second Memory devices over said first portion of said cycle; with said second pair of contacts being operatively connected for short-circuiting said second switch control means in the actuated position of the latter control means over said second portion of said cycle.

2. In a machine tool control system for starting and stopping a cyclically operating machine device in response to the energization of electromagnetic machine device control means connected to said machine device, the combination of first, second and third bistable control devices each having an output circuit, and a first input control circuit for producing an output signal in said output circuit, and a second input control circuit for cutting off said output signal in said output circuit; with the output circuit of said first bistable control device being coupled to the first input control circuit of said second bistable control device for energization thereof; a first And device coupling the output circuit of said second bistable device to said machine device control means for energization of the latter control means responsive to energization of a first input control circuit of said first And device; said first And device being further coupled to said first input control circuit of said third bistable device for energization of the latter device by the output signal from said second bistable device; an Or device responsive to energization of said first input control circuit of said first And device for energizing said second input control circuit of said first bistable device; a second And device coupling the output circuit of said third bistable device to said electromagnetic control means for energization of said electromagnetic control means; first switch means adapted to be driven by said machine device and including a first pair of contacts closed over a first portion of the operating cycle of said machine device and a second pair of contacts closed over a second portion of said operating cycle; manually actuable second switch means having a normally closed third pair of contacts and a normally open fourth pair of contacts; machine device operation selector means connected for energizing said first input control circuit of said first bistable device through said third pair of contacts of said manually actuable second switch means when said third pair of contacts is closed; with said operation selector means being operatively connected for energizing said input control circuit of said first And device through said fourth pair of contacts when closed; with said operation selector means and said first pair of contacts being coupled to said second input control circuits of said first and second bistable devices for energizing said respective second input control circuits of said first and second bistable devices over said first portion of said cycle; and with said operation selector means and said second pair of contacts being operative for short-circuiting said fourth pair of contacts over said second portion of said cycle.

3. In a machine tool control system for controlling a cyclically operating machine tool in response to the energization of machine tool control means operative with said machine tool, the combination of first and second bistable control devices each having an output circuit and a first input control circuit for producing an output signal in said output circuit, and a second input control circuit for cutting off said output signal in said output circuit; a first And device having first and second input control circuits and being coupled between the output circuit of said second bistable device and said machine tool control means for energization of the latter control means responsive to energization of both of said first and second input control circuits of said first And device; said first And device being further coupled to said first input control circuit of said second bistable device for energization by an output signal from said first And device; an Or device responsive to an output signal from said first And device for energizing said second input control circuit of said first bistable device; a second And device coupling the output circuit of said second bistable device to said machine tool control means; manually actuable switch means having a normally closed first pair of contacts and a normally open second pair of contacts; with said first pair of contacts of said manually actuable switch means being operative for energizing the first input control circuit of said first And device when said first pair of contacts is closed; with said second pair of contacts being coupled to said second input control circuits of said first bistable device for energizing said second input control circuit of said first bistable device when said second pair of contacts is closed, and a third And device operatively connected to said switch means and responsive to simultaneous energization of said first input control circuit of said first bistable device and said second input control circuit of said first And device for effecting the simultaneous energization of said second input control circuits of said first and second bistable devices.

4. In a machine tool control system for controlling the operation of a machine tool in response to the energization of a machine tool control device operatively connected to said machine tool, the combination of first and second bistable Memory devices each having an output circuit and a first input On control circuit for producing an output signal in said output circuit, and a second input Off control circuit for terminating said output signal in said output circuit; a first And device coupling the output circuit of said second bistable Memory device to said machine tool control device for energization of the latter control device responsive to energization of each input control circuit of said first And device; said first And device being further coupled to said first input On control circuit of said second bistable Memory device for energization of the latter Memory device in accordance with an output signal from said first bistable Memory device; an Or device responsive to energization of each input control circuit of said first And device for energizing said second input Off control circuit of said first bistable Memory device; a second And device coupling the output circuit of said second bistable Memory device to said machine tool control device for energization of said machine tool control device; switch control means having a first position and a second position and being operatively connected for energizing a first input control circuit of said first And device in said first position and for energizing a second input control circuit of said first And device in said second position.

5. In a machine tool control system for controlling a cyclically operating machine tool in response to the energization of electromagnetic machine tool control means operatively connected to said machine tool, the combination of first and second bistable Memory devices each having an output circuit and a first input On control circuit for producing an output signal in said output circuit, and a second input Off control circuit for cutting off said output signal in said output circuit; a first And device coupling the output circuit of said first bistable Memory device to said electromagnetic control means for energization of said control means responsive to energization of each input control circuit of said first And device; said first And device being further coupled to said first input On control circuit of said second bistable Memory device for energization of the latter Memory device by an output signal from said first bistable Memory device; a first control device operative with said first And device and responsive to the energization of said input control circuit of said first And device for energizing said second input Off control circuit of said first bistable Memory device; a second And device coupling the output circuit of said second bistable Memory device to said electromagnetic control means for energization of said electromagnetic control means; first switch means adapted to be driven by said machine tool and having at least first and second contact means; second switch means having a first position and a second position and operative for energizing said first input control circuit of said first And device while in said first closed position and for energizing a second input control circuit of said first And device in said actuated position; with said first switch means having said first contact means operatively connected for energizing said second input Off control circuits of said first bistable Memory device when in said first position; and with said first switch means when in said second position being operative with said second contact means for energizing said second input control circuit of said second Memory device.

6. In a control system for controlling the operation cycle of a machine device in response to the energization of electromagnetic machine device control means operative with said machine device, the combination of a bistable Memory device having an output circuit, and a first input On control circuit for producing an output signal in said output circuit and a second input Off control circuit for terminating said output signal in said output circuit; a first And device having a pair of inputs and being connected between the output circuit of said first bistable Memory device and said electromagnetic control means for energization of the latter control means responsive to said output signal of said first Memory device; a second And device having at least a pair of inputs and being connected to energize said second input Off control circuit of said bistable Memory device; a switch control device having a first normal position and a second actuated position and being operatively connected for energizing the input On control circuit of said Memory device and one input of said second And device when in the first normal position of said switch control device; with said switch control device when in said second actuated position being connected to energize the other input of said second And device, such that should both of said pair of inputs of the second And device be simultaneously energized the second And device will energize the second input Off control circuit of the Memory device for terminating the output signal in the output circuit of the Memory device.

7. In a control system for controlling a cyclically operating machine device in response to the energization of electromagnetic control means operative with said machine device, the combination of first and second bistable Memory devices each having an output circuit, and a first input On control circuit for producing an output signal in said output circuit and a second input Off control circuit for terminating said output signal in said output circuit; with the output circuit of said first bistable Memory device being coupled to the first input On control circuit of said second bistable Memory device for energization thereof; and with the output circuit of said second bistable Memory device being coupled to said electromagnetic means for energization thereof responsive to energization of said first input On control circuit of said second Memory device; a Not device having an input circuit and having an output circuit coupled to said second input Off control circuit of said second Memory device; said output circuit of the first Memory device being coupled to said electromagnetic means for energization of said electromagnetic means; a first switch device adapted to be driven by said machine device and including a first pair of contacts that are closed over a predetermined portion of the operating cycle of said machine device and connected to energize said input circuit of the Not device when said first pair of contacts is closed, a second switch device having a second pair of contacts connected to energize said first input On control circuit of the first Memory device when said second pair of contacts is closed.

8. In a control system for controlling the operation cycle of a machine device, the combination of a bistable Memory device having an output circuit and a first On control input circuit for producing a given output signal in said output circuit, and a second Off control input circuit for terminating said signal in said output circuit; with the output circuit of said Memory device being operative with an And device for coupling the output circuit of said bistable Memory device to said machine device for initiating the operation of the latter machine device, with said And device having a pair of input circuits and having one of the latter input circuits energized by said output signal from the Memory device; a switch device having a normally closed first pair of contacts and a normally open second pair of contacts, with said first pair of contacts being connected to initially energize said first On control input circuit of the Memory device and to thereby energize said one input circuit of the And device, and with said second pair of contacts being connected to energize the other input of the And device when said second pair of contacts is closed to thereby cause said And device to initiate the operation of said machine device.

9. In a control system for controlling a cyclically operating machine device, the combination of a bistable Memory device having an output circuit and a first On control input circuit for providing an output signal in said output circuit, and a second Off control input circuit for terminating said output signal in said output circuit; with the output circuit of said Memory device being coupled to one input of a first And device having at least a pair of inputs, with said And device being coupled to control the operation of said machine device when both of said inputs are simultaneously energized; a second And device having a pair of inputs and being coupled to energize the Off control input circuit of the Memory device when both of the latter pair of inputs are simultaneously energized; a switch device having a first non-actuated position and a second actuated position and including a first pair of contacts that are closed in said first position and open in said second position and including a second pair of contacts that are open in said first position and closed in said second position; with said first pair of contacts being connected when closed to energize the On control input of the Memory device and thereby to energize said one input of the first And device; said first pair of contacts when closed also being connected to energize one input of the second And device, and with said switch device when activated having said second pair of now closed contacts connected to energize the other input of said first And device to thereby control the operation of said machine device and also having said second pair of contacts connected to energize the other input of the second And device.

References Cited in the file of this patent

Publication: "A Cypak System Used as an Anti-Repeat, Air Clutch Press Control," by R. E. Gilboney, April 20, 1955.